US012276401B2

(12) United States Patent
Lambooij et al.

(10) Patent No.: US 12,276,401 B2
(45) Date of Patent: Apr. 15, 2025

(54) LIGHTING DEVICE PROVIDING AN IMPROVED VISIBILITY

(71) Applicant: SIGNIFY HOLDING B.V., Eindhoven (NL)

(72) Inventors: Marcus Theodorus Maria Lambooij, Eindhoven (NL); Michel Cornelis Josephus Marie Vissenberg, Roermond (NL); Tobias Borra, Rijswijk (NL); Maurice Alexander Hugo Donners, Waalre (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/576,141

(22) PCT Filed: Jul. 5, 2022

(86) PCT No.: PCT/EP2022/068631
§ 371 (c)(1),
(2) Date: Jan. 3, 2024

(87) PCT Pub. No.: WO2023/280879
PCT Pub. Date: Jan. 12, 2023

(65) Prior Publication Data

US 2025/0093016 A1 Mar. 20, 2025

(30) Foreign Application Priority Data

Jul. 8, 2021 (EP) .................................... 21184503

(51) Int. Cl.
*F21S 8/08* (2006.01)
*F21V 5/04* (2006.01)
(Continued)

(52) U.S. Cl.
CPC ............... *F21V 11/14* (2013.01); *F21S 8/085* (2013.01); *F21V 5/048* (2013.01);
(Continued)

(58) Field of Classification Search
CPC .......... F21V 11/14; F21V 5/048; F21V 21/00; F21S 8/085; F21S 8/081; F21S 8/086;
(Continued)

(56) References Cited

U.S. PATENT DOCUMENTS 7,731,383 B2 * 6/2010 Myer ...................... F21S 9/037 362/373
8,136,969 B2 * 3/2012 Burkett .................. H05B 47/19 362/153.1
(Continued)

FOREIGN PATENT DOCUMENTS

EP 1431653 A2 6/2004
EP 3572278 A1 11/2019
(Continued)

*Primary Examiner* — Bao Q Truong

(57) ABSTRACT

The present invention relates to a lighting arrangement (1) for outdoor illumination, the lighting arrangement comprising at least one first light source for emitting a first light and at least one second light source arranged at a distance from the first light source and arranged for emitting a second light. The lighting arrangement further comprises a modulating optical element (7) for converting the first light into a modulated first light providing a first illumination pattern on a first target surface (4'), wherein the first illumination pattern comprises a sequence of alternating illuminance peaks. The modulating optical element (7) further converts the second light into a modulated second light providing a second illumination pattern on a second target surface (4"), wherein the second illumination pattern comprises a sequence of alternating illuminance peaks. The first and the second target surfaces at least partially overlap, and the first
(Continued)

illumination pattern is substantially complementary to the second illumination pattern.

13 Claims, 14 Drawing Sheets

(51) Int. Cl.

| | |
|---|---|
| ***F21V 11/14*** | (2006.01) |
| *F21W 131/103* | (2006.01) |
| *F21Y 113/00* | (2016.01) |
| *F21Y 115/10* | (2016.01) |

(52) U.S. Cl.
CPC .... *F21W 2131/103* (2013.01); *F21Y 2113/00* (2013.01); *F21Y 2115/10* (2016.08)

(58) Field of Classification Search
CPC ..... F21S 8/088; F21S 8/00; F21S 8/08; F21Y 2115/10; F21Y 2113/00; F21W 2131/103; F21W 2131/10
See application file for complete search history.

(56) References Cited

U.S. PATENT DOCUMENTS

| | | | | |
|---|---|---|---|---|
| 8,308,318 | B2 * | 11/2012 | Maxik | F21V 23/0442 362/153.1 |
| 2008/0080178 | A1 * | 4/2008 | Kita | F21S 8/086 362/231 |
| 2009/0009089 | A1 | 1/2009 | Burkett | |
| 2017/0067609 | A1 | 3/2017 | Ichikawa et al. | |
| 2019/0329699 | A1 | 10/2019 | Neukam | |
| 2020/0198527 | A1 | 6/2020 | Koehler et al. | |

FOREIGN PATENT DOCUMENTS

| | | | |
|---|---|---|---|
| GB | 2497875 | A | 6/2013 |
| JP | H05109305 | A | 4/1993 |
| WO | 2010032183 | A1 | 3/2010 |

* cited by examiner 101
102
103
105

101
102
103
205

201
202
203
105

201
202
203
205

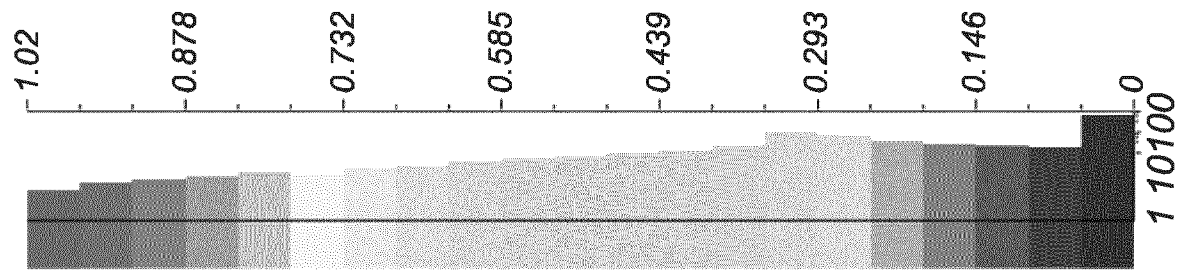
Fig. 4
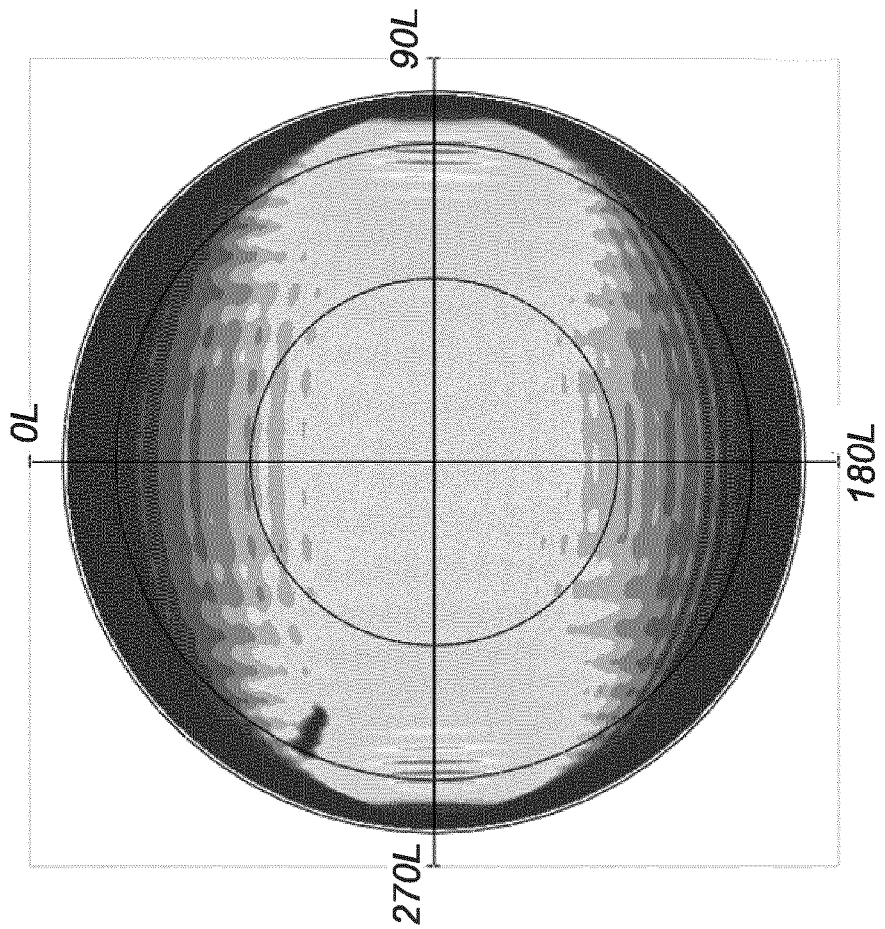

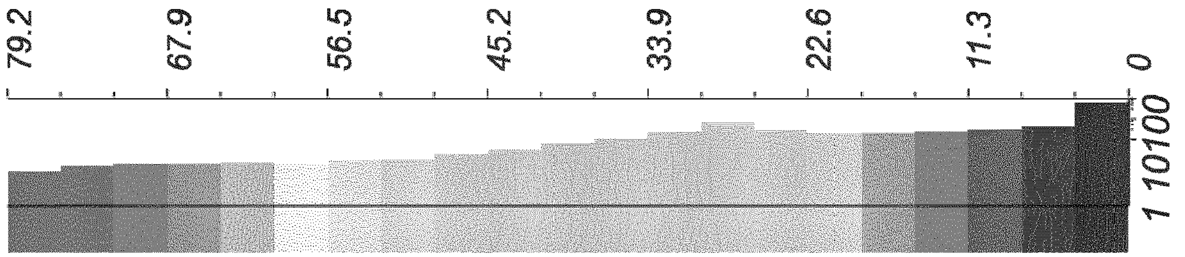
Fig. 8
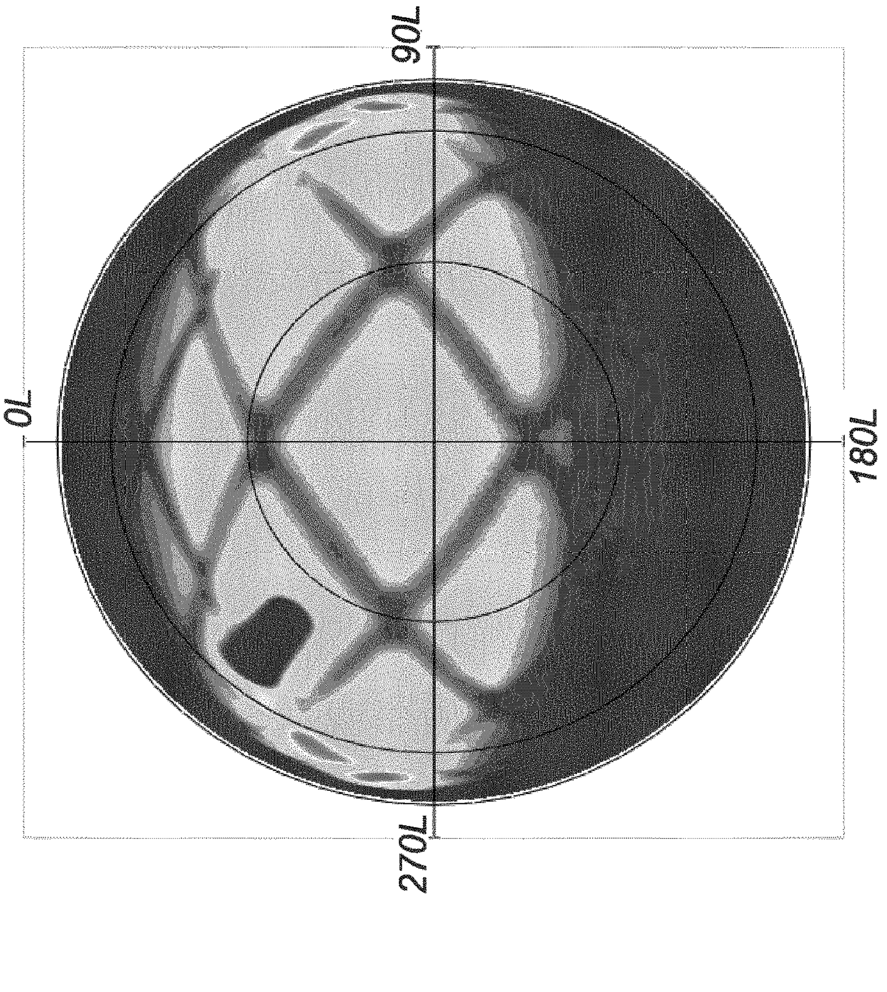

LIGHTING DEVICE PROVIDING AN IMPROVED VISIBILITY

CROSS-REFERENCE TO PRIOR APPLICATIONS

This application is the U.S. National Phase application under 35 U.S.C. § 371 of International Application No. PCT/EP2022/068631, filed on Jul. 5, 2022, which claims the benefit of European Patent Application No. 21184503.7, filed on Jul. 8, 2021. These applications are hereby incorporated by reference herein.

FIELD OF THE INVENTION

The present invention relates to a lighting arrangement for outdoor illumination of a target surface.

BACKGROUND OF THE INVENTION

A global trend that impacts safety on the road networks including crossings and intersections is increasing city size, directly resulting in an increasing number of road users, e.g. cars, busses, cabs, cyclists, and pedestrians. Another global trend in the form of speed bikes results in increasing cyclist speed.

Most accidents involving unprotected road users, such as pedestrians and cyclists, occur at crossings and intersections, especially in darkness. The lack of proper lighting for pedestrians is one of the primary factors of pedestrian fatality, and nearly 75% of pedestrian accidents occur at night. Such accidents are particularly dangerous since the unprotected road users are at greater risk of a serious injury or fatality. It is thus desirable to eliminate or at least minimize such accidents. To this end, visibility should be maximized, in particular during the dark hours.

Improved visibility of an object may be achieved by providing contrast between the object and the background. Negative contrast means that the illuminated object is darker than the background, while positive contrast is the opposite, i.e. the object being lighter than the background. Negative and positive contrast are the two main lighting solutions for pedestrian crossings that are offered by the current standard. Positive contrast solutions are preferred, where pedestrian crossings are illuminated by dedicated luminaires with asymmetric light distribution. However, transition from one type of contrast to the other can occur depending on the situation, e.g. time of the day, sun light intensity, clothes of the unprotected road user or aiming of head lights of a vehicle, resulting in visibility issues during such a transition.

According to the currently available solutions, a contrast may be realized e.g. by adding road lighting or increasing light level of present road lighting. Increased light level improves visibility and as such reduces number of accidents.

Increased light level is however not always desired and is often not considered in the infrastructure strategy plans of cities. Usually, design of new or replacement road lighting considers energy efficient lighting systems that are available, thereby balancing energy and visual performance. Increased light level in general also results in light pollution such as sky glow and unobtrusive light that may impact biodiversity.

Further, increased light level may not always solve the problem of poor visibility, may induce a discomfort glare or even disability glare which decreases visibility, and can result in reduced contrast of pedestrians in areas of transition between negative and positive contrast. Discomfort glare is an uncomfortable bright light, not necessarily affecting visibility of object. Disability glare on the other hand reduces visibility but is not necessarily uncomfortable.

Therefore, there is a need for a lighting device providing an improved visibility, while being cost-efficient during manufacturing, installation and maintaining.

WO2010032183 discloses a light emitting device comprising at least two light emitting diodes and a first optical layer comprising a plurality of lenses. The first optical layer is directly illuminated by the light emitting diodes and is adapted to create a plurality of images of the light emitting diodes.

SUMMARY OF THE INVENTION

In view of the above, the present invention provides a lighting arrangement for outdoor illumination. The lighting arrangement may be a luminaire. The lighting arrangement may be positioned in areas where accidents due to poor visibility are likely to occur, such as pedestrian crossings, intersections, parking lots or the like.

The lighting arrangement comprises at least one first light source for emitting a first light and at least one second light source for emitting a second light. The first light source is arranged in a first lighting device, and the second light source is arranged in a second lighting device.

The second lighting device is arranged at a distance from the first lighting device, the distance being from 0.3 m to 10 m.

The first and/or the second light source may be arranged on a carrier, such as a printed circuit board (PCB). The at least one first and/or second light source may be a light emitting diode (LED). The term "LED" as used in the context of the present invention implies any type of LED known in the art, such as inorganic LED(s), organic LED(s), polymer/polymeric LEDs, violet LEDs, blue LEDs, optically pumped phosphor coated LEDs, optically pumped nano-crystal LEDs. As used herein, the term "LED" can encompass a bare LED die arranged in a housing, which may be referred to as a LED package.

The first light source may be arranged in a first lighting module. The first lighting module may further comprise a first light exit window for releasing the first light. The first light exit window may have any suitable shape and size. In particular, the shape of the first light exit window may correspond to the cross-section shape of the first lighting module. For instance, if the first lighting module has a cuboid shape, the first light exit window may be rectangular.

The lighting arrangement may comprise a plurality of first light sources. In such an embodiment, the first light sources may be evenly distributed along the entire first lighting module. By the expression "evenly distributed" is meant that the number of light sources per area unit of the lighting module is constant.

In particular, the plurality of first light sources may be arranged as a single linear array, such as a single straight column, a wave-shaped line, a zig-zag line, or the like. Alternatively, the plurality of first light sources may be arranged as several linear arrays, preferably being parallel to each other. Further, the plurality of first LEDs may be distributed in any other ordered pattern, such as stars, triangles, circles, or the like, or may be randomly distributed along the lighting module. It is further conceivable to provide the plurality of first light sources being arranged as a combination of at least two of the above-mentioned distribution patterns. The plurality of first light sources may comprise at least 10 first light sources, preferably at least 20 first light sources, more preferably at least 30 first light sources.

Analogously, the second light source may be arranged in a second lighting module comprising a second light exit window for releasing the second light. The second light exit window may have any suitable shape and size. In particular, the shape of the second light exit window may correspond to the cross-section shape of the second lighting module. For instance, of the second lighting module has a cuboid shape, the second light exit window may be rectangular.

The lighting arrangement may comprise a plurality of second light sources. In such an embodiment, the second light sources may be evenly distributed along the entire second lighting module. In particular, the plurality of second light sources may be arranged as a single linear array, such as a single straight column, a wave-shaped line, a zig-zag line, or the like. Alternatively, the plurality of second light sources may be arranged as several linear arrays, preferably being parallel to each other. Further, the plurality of second LEDs may be distributed in any other ordered pattern, such as stars, triangles, circles, or the like, or may be randomly distributed along the lighting module. It is further conceivable to provide the plurality of second light sources being arranged as a combination of at least two of the above-mentioned distribution patterns. The plurality of second light sources may comprise at least 10 second light sources, preferably at least 20 second light sources, more preferably at least 30 second light sources.

The plurality of the first and the second light sources may be arranged as a staggered grid, i.e. an alternating pattern of first and second light sources in a 2D aray.

The lighting arrangement further comprises a first modulating optical element for converting the first light into a modulated first light providing a first illumination pattern on a first target surface, and a second modulating optical element for converting said second light into a modulated second light providing a second illumination pattern on a second target surface.

The second lighting device is arranged at a distance from the first lighting device, the distance being from 0.3 m to 10 m.

The first target surface and the second target surface at least partially overlap.

Each of the first illumination pattern and the second illumination pattern comprises a sequence of alternating illuminance peaks. By the term "illuminance peaks" is understood maxima and minima in the illuminance being measured in lux and representing the total luminous flux incident on a surface, per unit area.

In other words, the first light emitted by the at least one first light source will pass the first modulating optical element, whereby it will be converted into a modulated first light, and the second light emitted by the at least one second light source will pass the second modulating optical element, whereby it will be converted into a modulated second light.

The first and second optical modulating elements may be the same modulating optical element, which would then be common to the first light source and the second light source. The first and second optical modulating elements may also be different modulating optical elements, the first optical modulating element being dedicated to the first light source and the second modulating optical element being dedicated to the second light source.

The first and second optical modulating elements may be based on the same technology. In the remainder of this text, the term "the optical modulating element" may refer to either one of the first and second optical modulating elements.

The lighting arrangement of the present invention thus overcomes the issue of not reaching sufficient object contrast, resulting in dangerous situations, since the lighting arrangement enables a light distribution creating an illumination pattern having light and dark areas in order to counterbalance positive and negative contrast of objects, in particular pedestrians or cyclists, at crossings and intersections as described above.

The first and/or the second target surfaces may be an area where improved visibility is important in order to avoid accidents, e.g. a crossroad, a parking lot, a pedestrian crossing, or the like. The first and the second target surfaces at least partially overlap. Preferably, the first and the second target surfaces coincide. The first illumination pattern is substantially complementary to the second illumination pattern. In other words, each illuminance maximum in the first illumination pattern is arranged substantially between two illuminance maxima in the second illumination pattern. Further, each illuminance minimum in the first illumination pattern is arranged substantially between two illuminance minima in the second illumination pattern. It may also be described as the total modulation, or maximum modulation amplitude, of the combined first and second illumination patterns is less than that of each individual illumination pattern.

Sometimes the illumination pattern comprising a sequence of alternating illuminance peaks may be perceived as disturbing by the road users. Therefore, it may be desirable to hide such an illumination pattern on the target surface, while still providing improved visibility of objects being illuminated by the lighting arrangement. The lighting arrangement of the present invention thus provides an improved illumination pattern on the target surface, while enhancing visibility. The present invention offers the advantage of providing a substantially invisible illumination pattern on the target surface, since overlapping complementary illumination patterns will provide an impression of an even illuminance. On the other hand, at a distance vertically from the target surface, i.e. in the space where a pedestrian is normally moving, the first and the second illumination patterns will still be perceivable, thus increasing visibility.

The first light source is arranged in a first lighting device, while the second light source is arranged in a second lighting device being arranged at the distance from the first lighting device. The distance between the first and the second light source is from 0.3 m to 10 m.

In an alternative example not according to the invention, the first and the second light sources may be arranged in a first lighting device, i.e. the first and the second light sources may be arranged in the same lighting device. The distance between the first and the second light sources may be from 10 mm to 50 cm.

Thus, the first and the second light sources may be in the form of LEDs arranged on the same PCB. In such an embodiment, the distance between the first and the second light source may be from 10 to 30 mm. If a plurality of the first and the second light sources is present. The first and the second light sources may be arranged in a checkerboard arrangement on the same PCB.

Further, the first and the second light sources may be arranged on different PCBs. In such an embodiment, the distance between the first and the second light source may be from 30 mm to 10 cm. Finally, the first and the second light sources may be in the form of large COB type LEDs. In such an embodiment, the distance between the first and the second light source may be from 10 cm to 50 cm.

The lighting arrangement may further comprise a supporting element, such as a post, a line or combination thereof. Thus, the lighting arrangement may comprise at least one lighting device as described above, being arranged on a post, or suspended on a line extending between posts or buildings.

As mentioned above, the supporting element may be a post making the lighting arrangement suitable for road or street lighting. It may further be a smaller post making the lighting arrangement suitable for lighting of sidewalks, walking trails, garden lighting, or illumination of parks. The supporting element may also be a ceiling of a tunnel such that the lighting arrangement may be used for lighting the tunnel, or some other ceiling. Furthermore, a wall may act as a supporting element, such that the lighting arrangement can be attached to the wall for lighting of tunnels, or even indoor lighting, such as for lighting a pedestrian crossing in a large warehouse or factory hall where lorries and/or forklifts operate.

In particular, the lighting arrangement may comprise one supporting element having a vertical extension, wherein the first and the second lighting devices are arranged at a distance from each other along the vertical extension of the supporting element. In such an embodiment, the distance between the first and the second lighting device may be from 0.5 m to 2 m. In other words, the first and second lighting devices may be arranged at different heights along the vertical extension of the post. Alternatively, the first and second lighting devices may be arranged at the same height but extending in different directions being perpendicular to the vertical extension of the supporting element.

Alternatively, the lighting arrangement may comprise a first and a second supporting element arranged at a distance from each other, wherein the first lighting device is arranged on the first supporting element, and wherein the second lighting device is arranged on the second supporting element. In such an embodiment, the distance between the first and the second supporting element may be from 5 m to 10 m. Preferably, the first and the second supporting elements are positioned on opposite sides of an area to be illuminated.

The lighting arrangement according to the present invention may further comprise at least one beam-shaping optical element for shaping the first and/or the second light emitted by the first and/or the second light source into a beam of light. Such a beam-shaping optical element may be a lens or a reflector surface. The modulating optical element may then be arranged on the at least one beam-shaping optical element. The modulating optical element may be a periodic optical structure, such as a pattern of changes in local curvature of the beam-shaping optical element, a scattering surface pattern, an absorbing surface pattern or the like. However, such an embodiment suffers from the disadvantage that the at least one light source must be significantly smaller compared to the size of the beam-shaping optical element in order to distinguish the subtle variations of the illumination pattern.

The lighting arrangement according to the present invention may further comprise a cover plate being arranged to cover at least one of the first and second light sources. Preferably, the cover plate covers both the first and the second light source. By the term "cover" is understood to be arranged over or to envelop.

The cover plate may be made of any suitable material being able to protect the first and/or the second light source from the ambient, while allowing sufficient amount of light to be released by the light sources. The material of the cover plate may be poly (metyhyl methacrylate) (PMMA), polycarbonate (PC), or glass.

The modulating optical element may be arranged on the cover plate. In particular, the modulating optical element may be arranged on the inner surface of the cover plate, i.e. the surface facing the light source, or on the outer surface of the cover plate, i.e. on the surface facing the ambient. It is preferred to arrange the modulating optical element on the outer surface of the cover plate, since the distance to the light source is increased, which leads to a sharper contrast in the illumination pattern. The modulating optical element may be a pattern of curved surfaces, e.g. lenses, or a pattern that is able to change the intensity of light in the direction towards the target surface. The modulating optical element may absorb, reflect, scatter, diffract or refract the light emitted by the first and/or the second light source.

If both a beam-shaping optical element and a cover plate are present, one modulating optical element may be arranged on each of these components. In such an embodiment, the modulating optical element on the beam-shaping optical element may be same as or different from the modulating optical element on the cover plate. Indeed, the modulating optical elements should be selected such that a desired illumination pattern is provided.

The modulating optical element may be a pattern corresponding to the first illumination pattern on the first target surface and the second illumination pattern on the second target surface. Further, the modulating optical element may comprise a first portion corresponding to the first illumination pattern on the first target surface, and a second portion corresponding to the second illumination pattern on the second target surface. Thus, the modulating optical element may be a checkboard pattern, a plurality of parallelly arranged lines, a square mesh of crossing lines, dots, or the like.

As mentioned above, the modulating optical element may be arranged in the beam-shaping optical element, e.g. a free-shape lens or a reflector. Alternatively, the modulating optical element may be in the form of an absorbing or scattering pattern on the beam-shaping optical element or the cover plate. The modulating optical element may be etched, printed, engraved, laminated, or applied by any other suitable method.

The lighting arrangement may comprise a control unit for individually controlling the first and the second light sources. In other words, the illumination pattern may be switched between the first illumination pattern and the second illumination pattern by selectively operating the first or the second light source.

Each of the first illumination pattern provided on the first target surface and the second illumination pattern provided on the second target surface may be a static pattern or a dynamic pattern. The term "static pattern" implies that the pattern is constant, while the term "dynamic pattern" means that the pattern may change.

The first and the second pattern are static, because they are determined by the modulating optical element. Only if the modulating element would be dynamic, these patterns could also be dynamic (but then we need to use rather exotic optical solutions with moving liquids or motorized rotating or transpating plates, or electronically switchable optics like liquid crystals or electrowtting . . . these are all not likely to be used because outdoor lighting needs to be robust).

The only dynamics in the pattern is the combined pattern: by dimming the two channels separately, we can have pattern 1, pattern 2 or a mix.

In the embodiment wherein the first and the second light sources are arranged in the same lighting device, or wherein the lighting arrangement comprises a first and a second supporting element arranged at a distance from each other, wherein the first lighting device is arranged on the first supporting element, and wherein the second lighting device is arranged on the second supporting element, the dynamic illumination pattern may be achieved by alternatingly switching on and off the first and the second light source. It should be noted that although the movement of an object across the target area illuminated by the lighting device of the present invention creates a dynamic effect, dynamic pattern may offer the advantage of enhancing the visibility of the object even further.

In a particular embodiment, the lighting arrangement may comprise a plurality of first light sources and a plurality of second light sources. The lighting arrangement may further comprise a plurality of beam-shaping optical elements, and a cover plate on which the modulating optical element is arranged such that the first illumination pattern is provided by the plurality of first light sources, and wherein the second illumination pattern is provided by the plurality of second light sources. In such an embodiment, a dynamic illumination pattern may be obtained by individually controlling the pluralities of the first and the second light sources. Such a dynamic illumination pattern may be desirable in order to achieve optimal visibility depending on e.g. weather conditions.

As mentioned above, the illumination pattern may be a 2D pattern of alternating light and dark areas. The distance between neighbouring light areas and/or the distance between neighbouring dark areas measured as a centre-to-centre distance may be from 10 cm to 100 cm. Such a distance allows sufficient visibility, while gaps between the illuminance peaks wherein an object becomes less visible are almost eliminated. The distance mentioned above provides a sufficient visibility of an illuminated object.

The illumination pattern may be tuned during manufacturing or during installation of the lighting system by translating/rotating the cover glass comprising the modulating optical element relative the light sources. In this way, the illumination pattern on the target area be adapted to e.g. the pole height and overlap of target areas of neighbouring lighting arrangements may be optimized for averaging out the patterns on the road, as was described above.

The illumination pattern may further be adaptable to the distance from the approaching car to the crossing pedestrian. This may be achieved by mechanically changing the distance between the modulating optical element and the light source, or by operating different groups of light sources associated with different portions of the modulating optical element.

To summarize, the lighting device of the present invention for outdoor applications at crossings and intersections provides improved visibility and safety. Further, the lighting arrangement of the present invention may be used for energy reduction, for avoiding animal related traffic accidents, general lighting with improved visibility, in particular for unprotected road users, as well as lighting for adverse weather conditions.

BRIEF DESCRIPTION OF THE DRAWINGS

These and other aspects of the present invention will now be described in more detail, with reference to the appended drawings showing example embodiments of the invention, wherein:

FIGS. 4 and 5 illustrate the intensity distribution and illuminance distribution on a road wherein the modulating optical element is arranged on the beam-shaping optical element;

FIGS. 8 and 9 depict the intensity and illuminance distribution on a target surface when the plurality of first light sources in FIG. 7 is on;

FIGS. 11 and 12 illustrate the intensity and illuminance distribution on a target surface when the plurality of second light sources in FIG. 7 is on;

Figure 1:
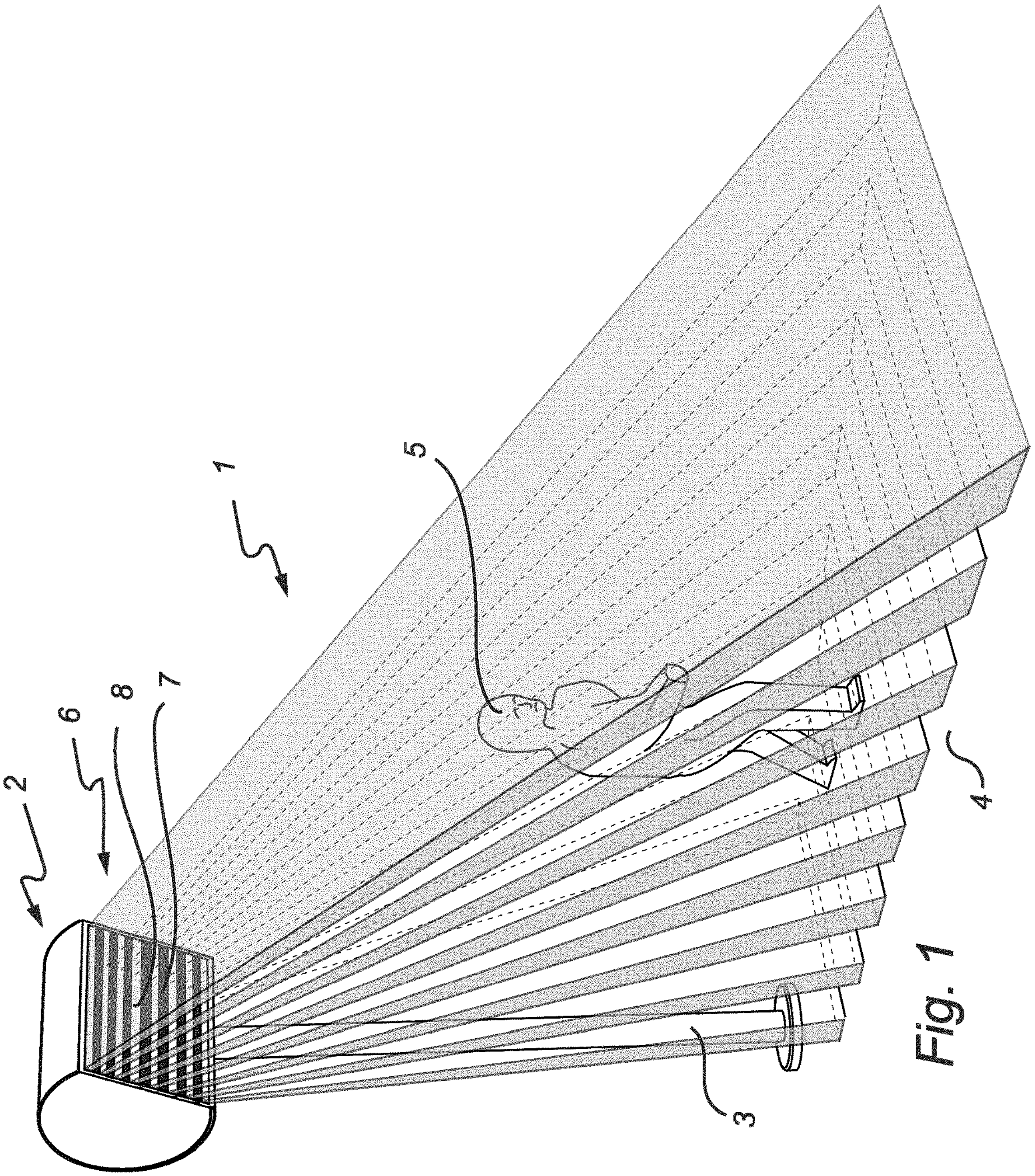
FIG. 1 illustrates a lighting arrangement of the present invention comprising a lighting device and a post.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical or similar reference numerals denote the same or similar components having a same or similar function, unless specifically stated otherwise.

FIG. 1 illustrates a lighting arrangement 1 comprising a lighting device 2 arranged on a post 3. The lighting device 2 is arranged for outdoor illumination of a target surface 4, in this case being a pedestrian crossing across which a pedestrian 5 is moving. The lighting device 2 comprises a first and a second light source for emitting a first and a second light.

The lighting device 2 comprises a light exit window 6 for releasing the light being emitted by the first and the second light sources. The lighting device 2 further comprises a modulating optical element 7 for converting the first light into a modulated first light providing a first illumination pattern on the first target surface 4', wherein the illumination pattern comprises a sequence of alternating illuminance peaks. It should be noted that in the embodiment depicted in FIG. 1, only one of the first and the second light sources is operating. The modulating optical element is arranged on the cover plate 8 covering the light exit window 6.

As mentioned above, the lighting arrangement of the present invention provides improved visibility of an object regardless the positive and negative contrast that may occur depending on the outer factors such as clothing of a pedestrian, illumination angle, weather conditions or the like.

Figures 2A, 2B, 2C, 2D:
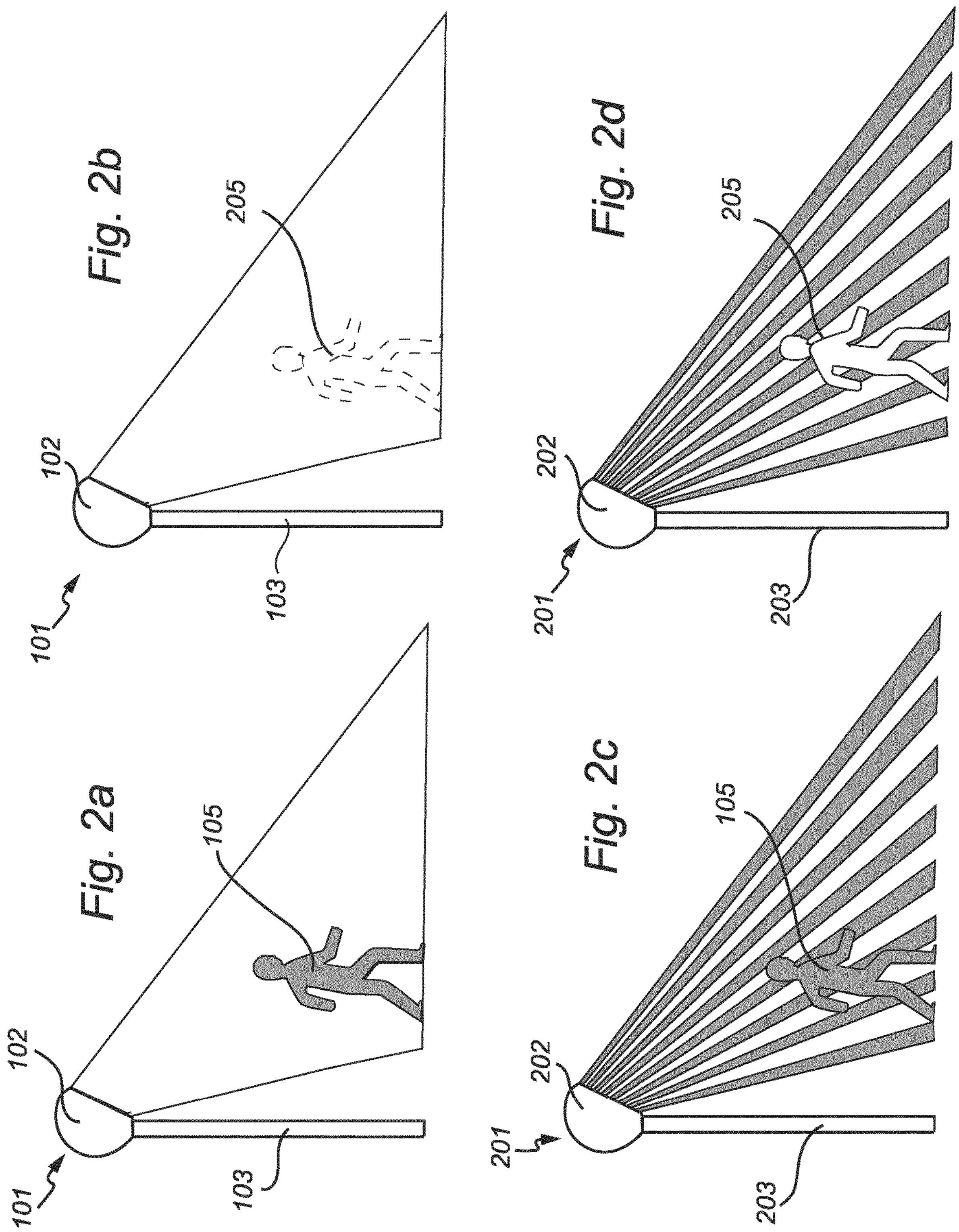
FIGS. 2*a*-2*d* illustrate the improved visibility provided by the lighting arrangement according to the present invention.

FIGS. 2*a* and 2*b* illustrate the lighting arrangement 101 according to the prior art, wherein a pedestrian 105 wearing dark clothing is visible, while a pedestrian 205 wearing light clothing is substantially invisible. FIGS. 2*c* and 2*d* depict the lighting arrangement 201 according to the present invention, wherein both the pedestrians 105 and 205 are clearly visible.

Figure 3A:
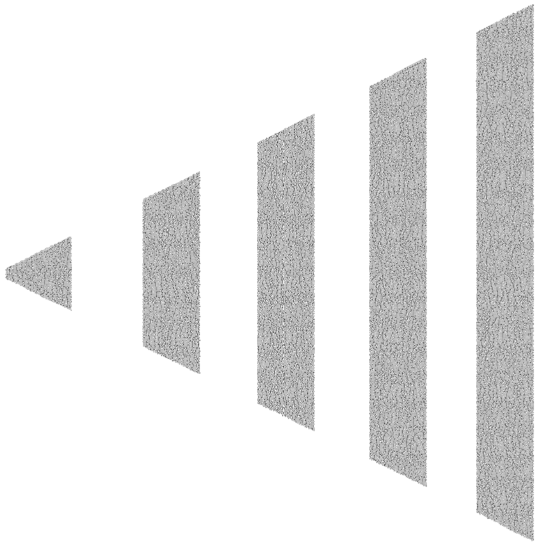
FIGS. 3*a*-3*c* depict illumination patterns on a target surface provided by the lighting arrangement of the present invention.
Figure 3B:
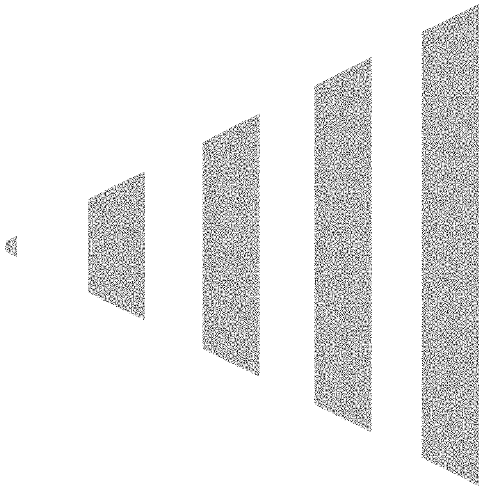
Figure 3C:
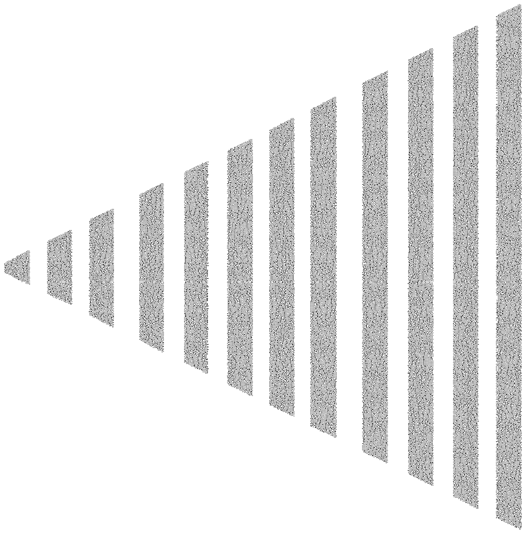

FIGS. 3*a*-3*c* illustrate illumination patterns comprising a sequence of alternating illuminance peaks. It should be noted that the illuminations patterns in FIGS. 3*a* and 3*b* are complementary.

Figure 5:
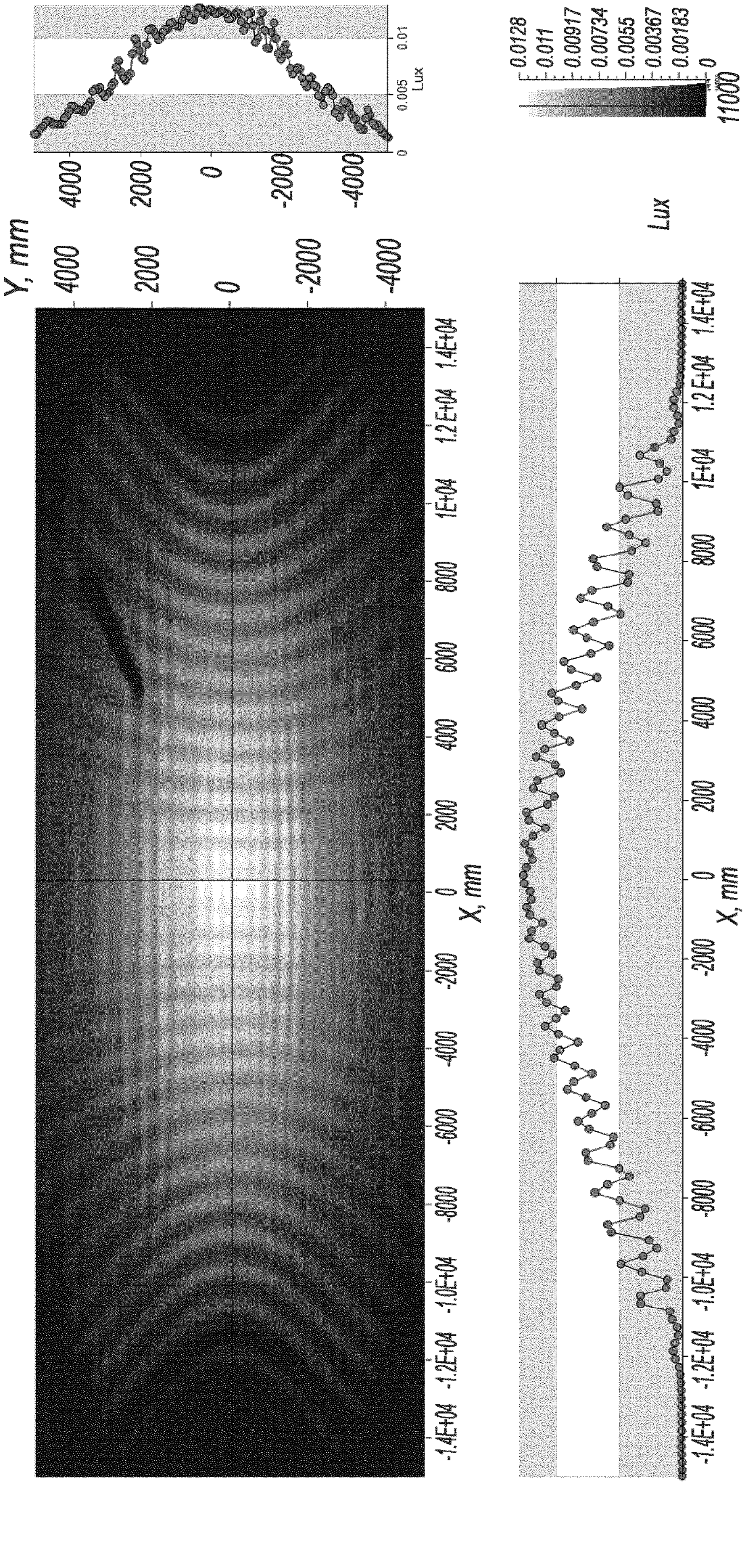
Figure 6:
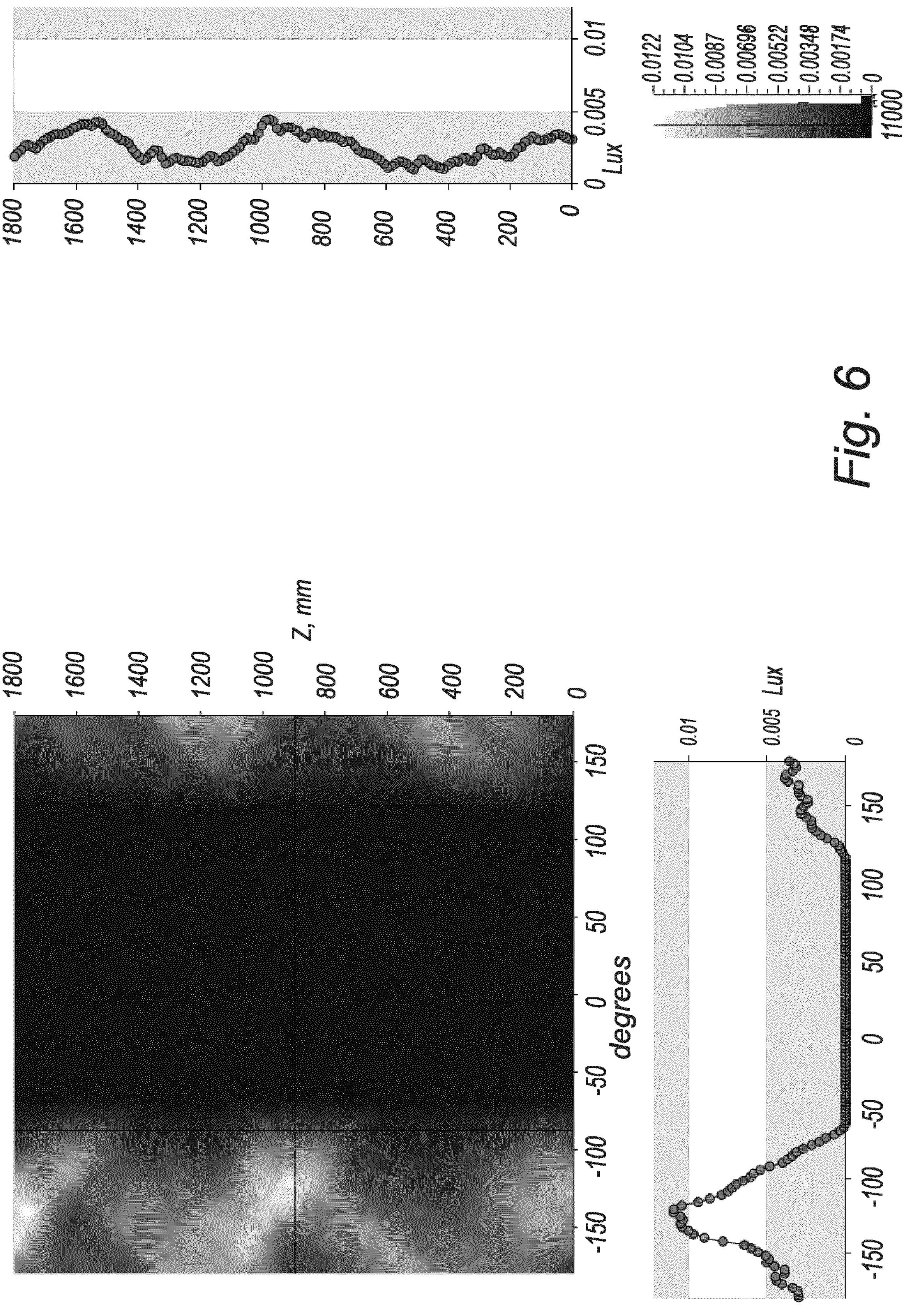
FIG. 6 is the illuminance distribution on a cylinder representing a pedestrian moving across the road depicted in FIGS. 4 and 5.

FIGS. 4 and 5 depict intensity and illuminance distribution provided by a lighting arrangement of the present invention. The lighting arrangement comprises a beam-shaping optical element in the form of a lens having a diameter of 30 mm, and a light source having area of 0.1×0.1 $mm^2$. A very small source size ("point source") was chosen to enable sharp modulation features in the illumination pattern. When larger sources are used, the features become less pronounced. The modulating optical element in the form of a checkboard pattern is arranged on the lens in the form of a slight variation in local lens curvature. As may be seen in FIGS. 4, and 5, the illumination pattern is clearly visible on a target surface. The dark shadow in the upper right corner in FIG. 5 is cast by a cylinder having a longitudinal extension of 180 cm and arranged such that the longitudinal extension of the cylinder is perpendicular to the target surface. The cylinder thus represents a pedestrian. FIG. 6 shows the illumination pattern on the unfolded cylinder, wherein the portion of the cylinder between −180 and −100 degrees and between 120 and 180 degrees is illuminated by the lighting device. The illumination pattern is clearly visible on the illuminated portion.

Figure 7:
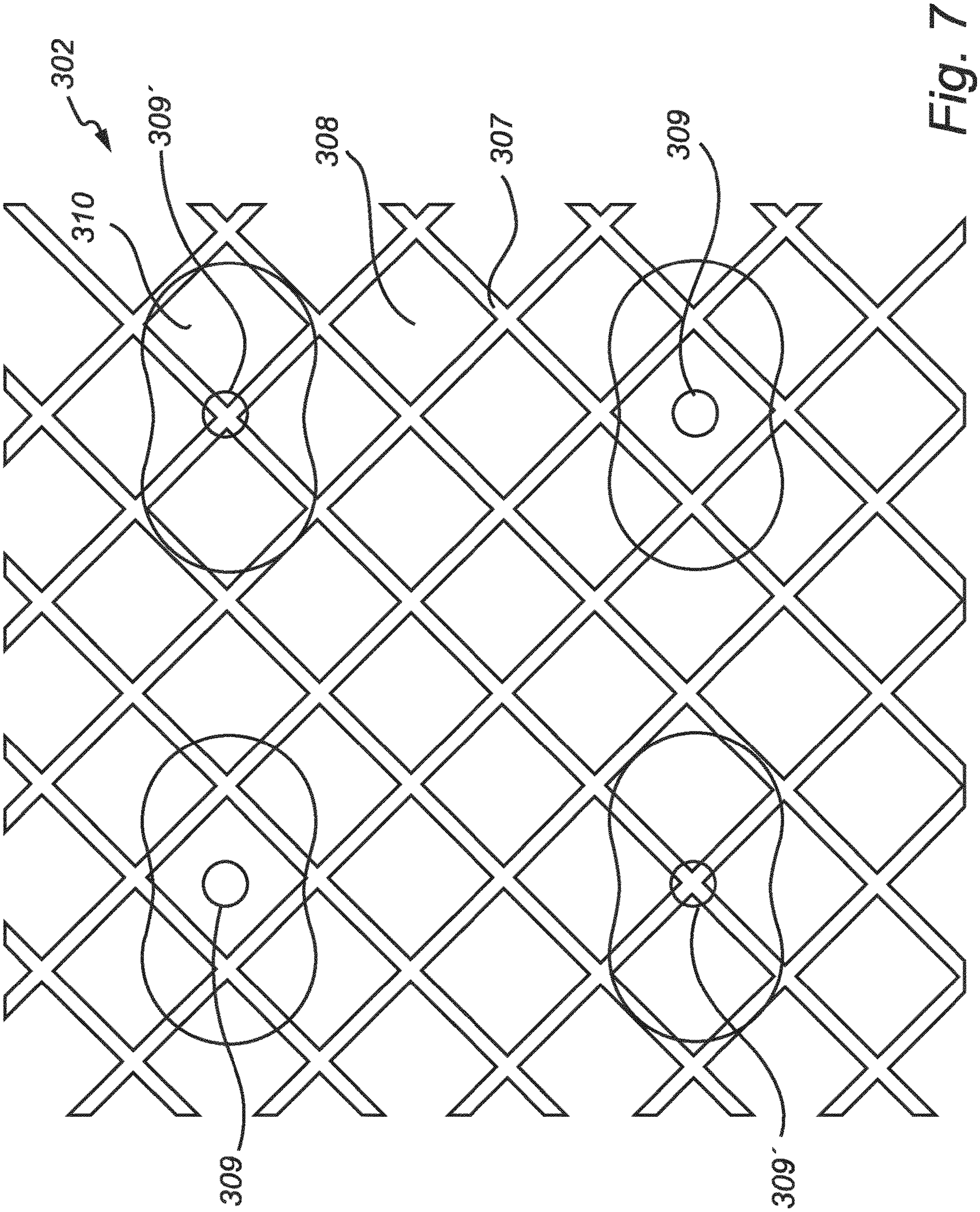
FIG. 7 shows a lighting device comprising a plurality of first light sources and a plurality of second light sources, a beam-shaping optical element in the form of a peanut lens optic with the modulating optical element in the form of an absorbing pattern on the cover plate.

FIG. 7 depicts a lighting arrangement 302 comprising a plurality of first light sources 309 and a plurality of second light sources 309'. The lighting arrangement 302 further comprises four beam-shaping optical elements 310, each beam-shaping optical element being assigned to a light source 309, 309'.

The modulating optical element 307 in the form of an absorbing grid is arranged on the cover plate 308. It should be noted that the pattern of the modulating optical element is selected such that the plurality of first light sources 309 is aligned with an opening in the grid, and the plurality of second light sources is aligned with a cross in the grid. Therefore, the plurality of first light sources and the plurality of second light sources will provide two distinctly different illumination patterns. When the first and the second light sources are operated individually, the lighting arrangement may dynamically switch between the two patterns or be in a state where both patterns are on, thus providing a reduced contrast.

Figure 9:
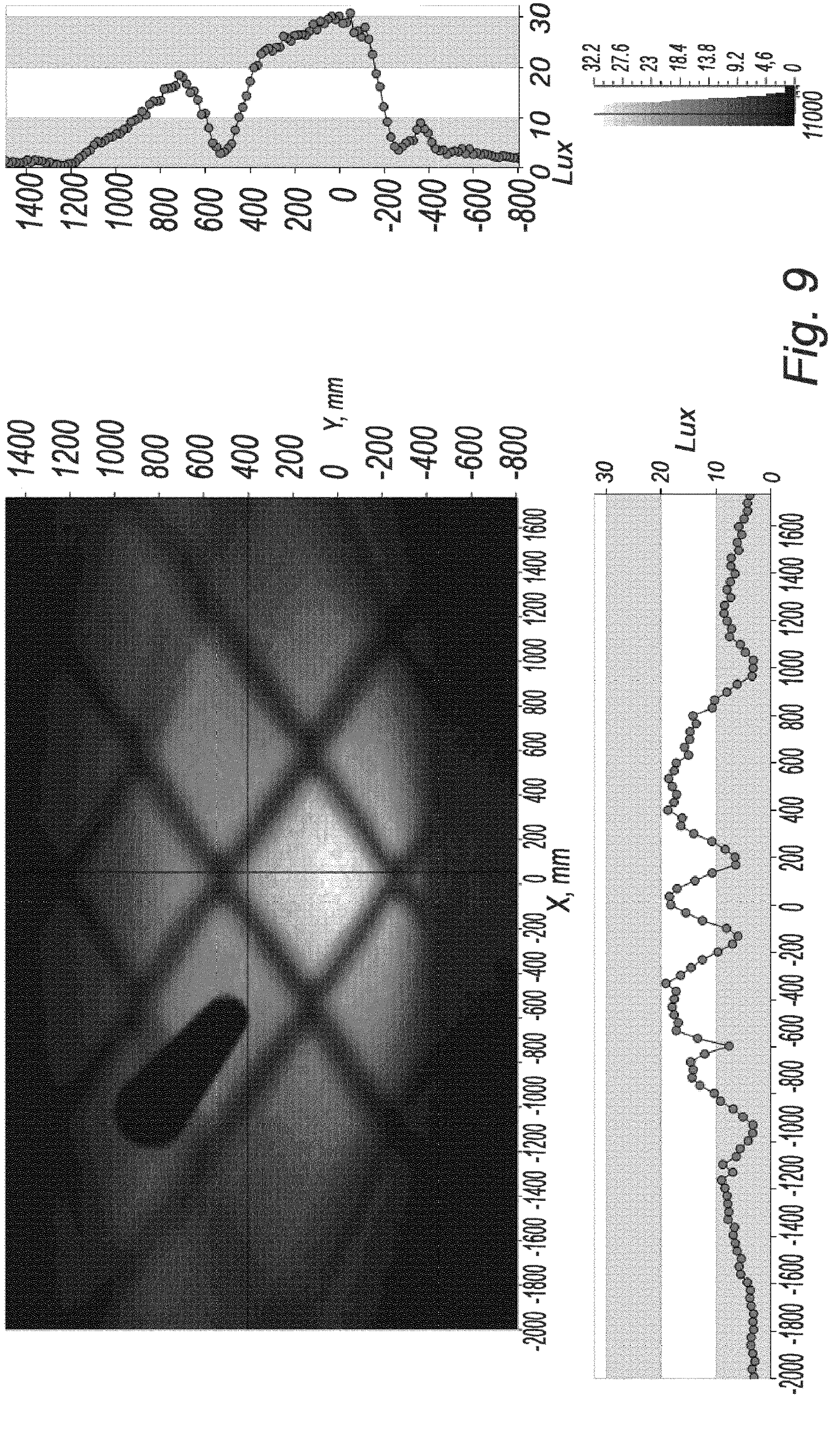
Figure 10:
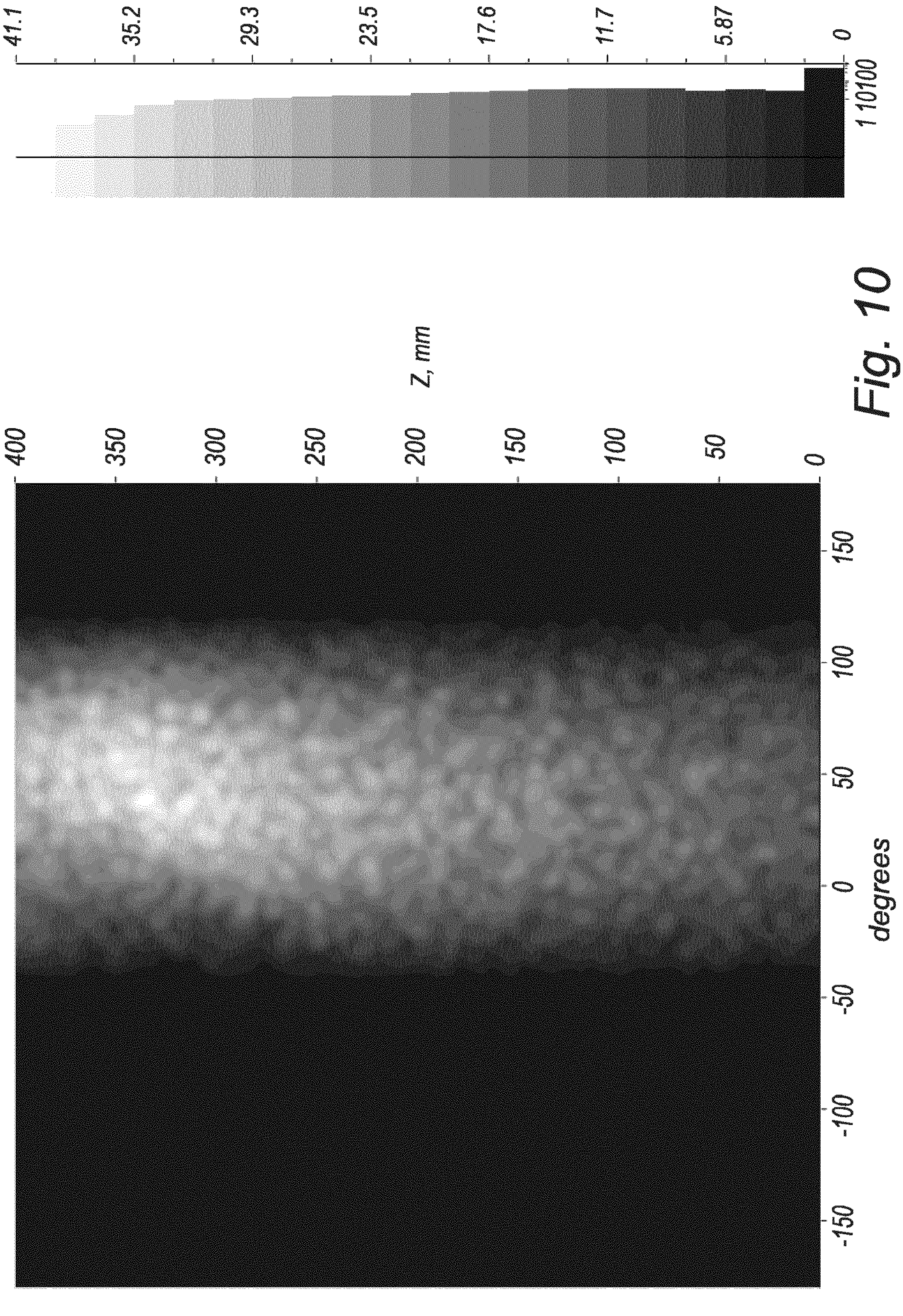
FIG. 10 depicts the illuminance distribution on a cylinder representing a pedestrian moving across the road depicted in FIGS. 8 and 9.

FIGS. 8 and 9 illustrate the intensity and illuminance distribution provided by a lighting device when the plurality of second light sources is operating. The dark shadow is cast by a cylinder having a longitudinal extension of 400 cm and arranged such that the longitudinal extension of the cylinder is perpendicular to the target surface. The cylinder thus represents a pedestrian. FIG. 10 shows the illumination pattern on the unfolded cylinder, wherein the portion of the cylinder between 0 and 100 degrees is illuminated by the lighting device. As may be seen in FIG. 10, the cylinder is rather evenly illuminated.

Figure 11:
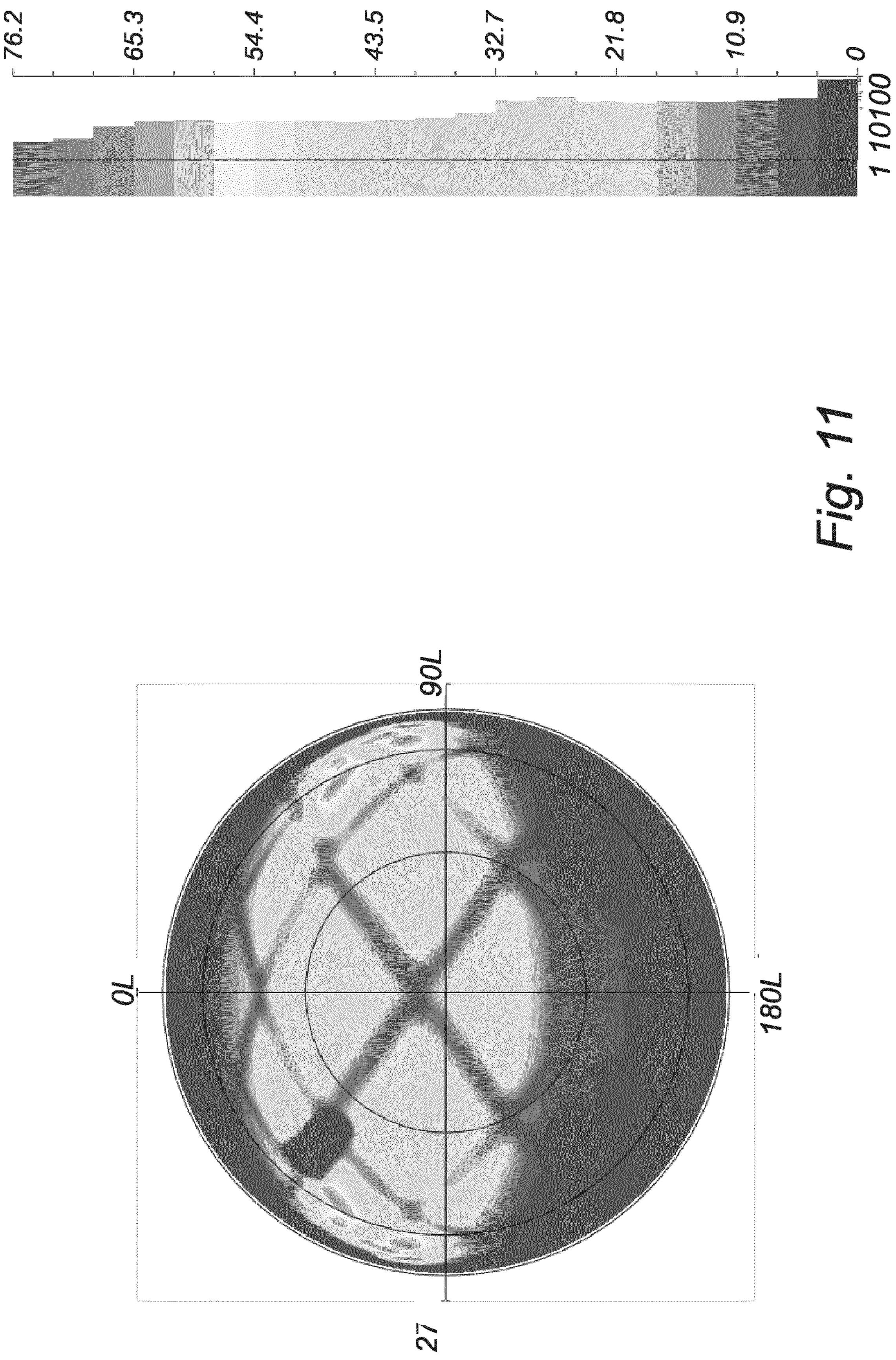
Figure 12:
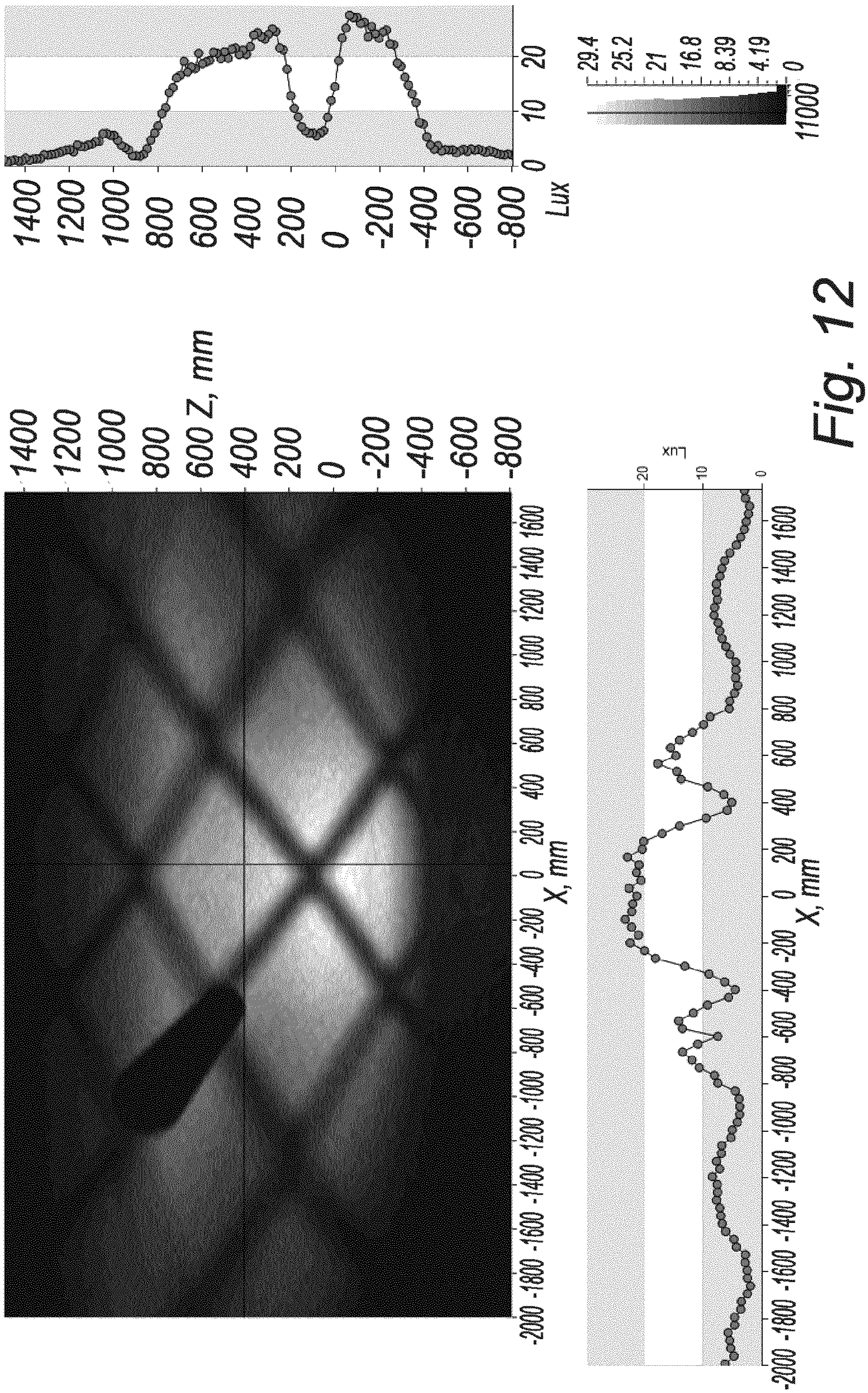
Figure 13:
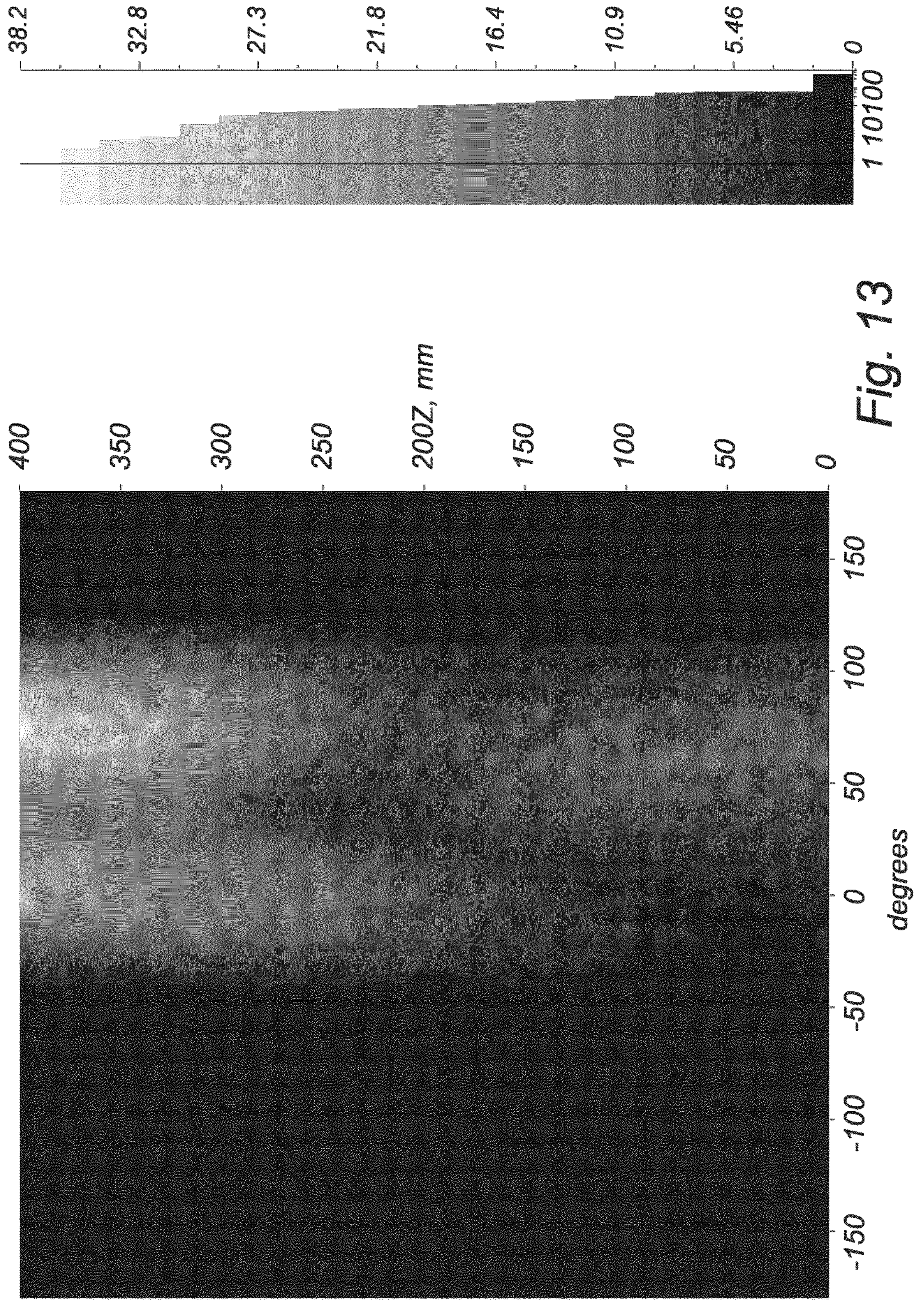
FIG. 13 depicts the illuminance distribution on a cylinder representing a pedestrian moving across the road depicted in FIGS. 11 and 12.

When the plurality of first light sources is operating instead, the intensity and illuminance distribution depicted in FIGS. 11 and 12 is obtained. As may be noted, the cylinder is now positioned in a dark area of the pattern. However, as may be seen in FIG. 13, the illumination pattern on the cylinder is clear even in this case.

Figure 14:
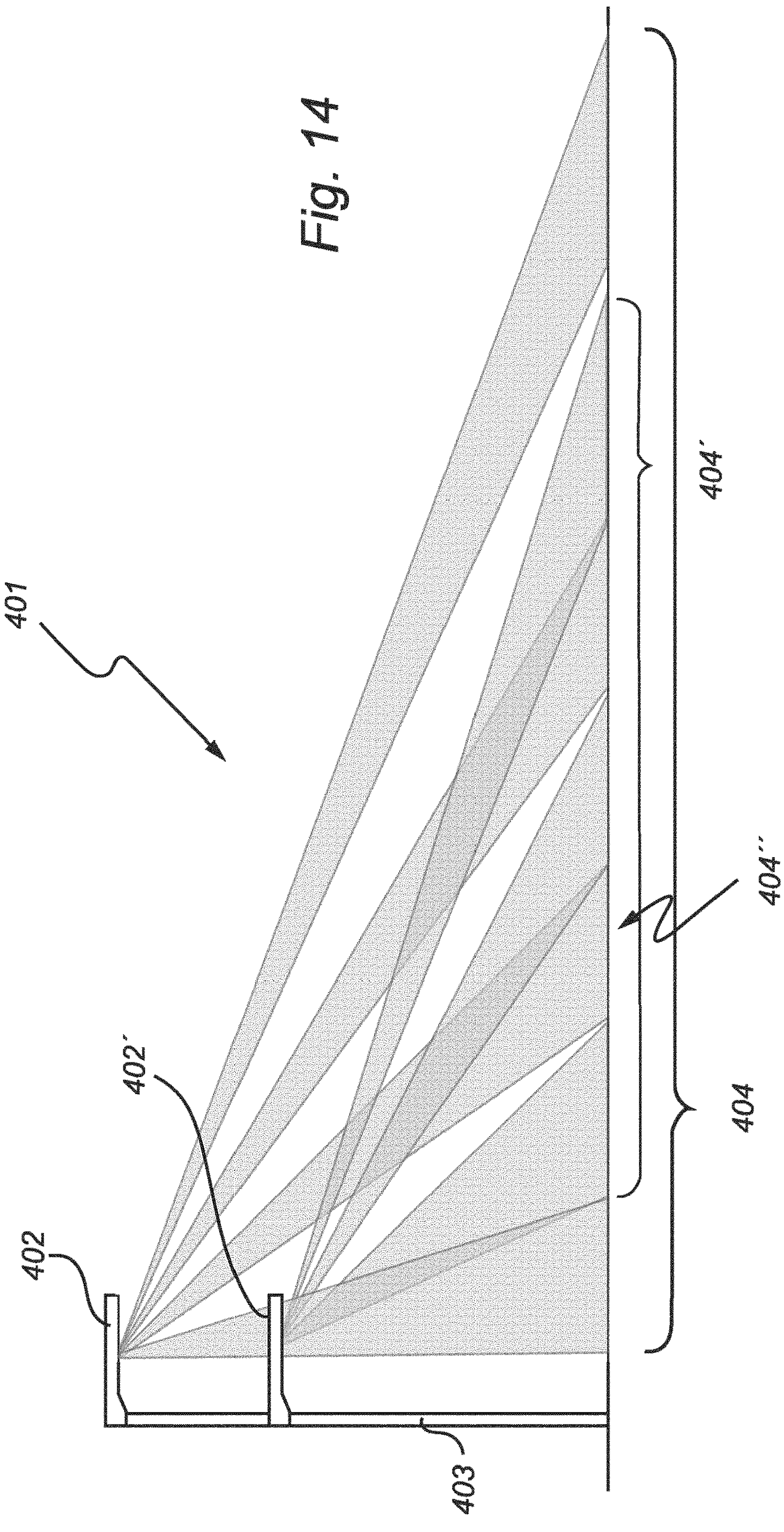
FIG. 14 shows a lighting arrangement comprising two lighting devices providing complementary illumination patterns on the target surface.

FIG. 14 illustrates a lighting arrangement 401 comprising a first lighting device 402 arranged on a post 403 extending vertically from the ground. Further, the lighting arrangement 401 comprises a second lighting device 402' wherein the second lighting device 402' is arranged at a distance from the first lighting device 402. The first lighting device 402 comprises a first light source which provides a first illumination pattern on a first target surface 404. As may be seen in FIG. 14, the first and second lighting devices 402, 402' are arranged at different heights along the vertical extension of the post 403. The second lighting device 402' comprises a second light source which further provides a second illumination pattern on a second target surface 404'. The first and the second target surfaces 404, 404' overlap thus forming a target surface 404'''. The first illumination pattern is complementary to the second illumination pattern. The complementary illumination patterns are chosen such that no pattern is visible on the target surface 404, but, because of the different positions of the light sources, the alignment breaks down at other heights and the pattern is visible on pedestrians. In other words, such an embodiment offers the advantage of providing a substantially invisible illumination pattern on the target surface 404, since overlapping complementary illumination patterns will provide an impression of an even illuminance. On the other hand, at a distance vertically from the target surface 404, i.e. in the space where a pedestrian is normally moving, the illumination pattern will still be perceivable, thus increasing visibility.

Although the present invention has been described with reference to various embodiments, those skilled in the art will recognize that changes may be made without departing from the scope of the invention. It is intended that the detailed description be regarded as illustrative and that the appended claims including all the equivalents are intended to define the scope of the invention. While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting arrangement for outdoor illumination, said lighting arrangement comprising:

a first light source for emitting a first light, the first light source being arranged in a first lighting device;

a second light source for emitting a second light, the second light source being arranged in a second lighting device;

a first modulating optical element for converting said first light into a modulated first light providing a first illumination pattern on a first target surface, and a second modulating optical element for converting said second light into a modulated second light providing a second illumination pattern on a second target surface, wherein the second lighting device is arranged at a distance from the first lighting device, the distance being from 0.3 m to 10 m, wherein said first target surface and said second target surface at least partially overlap, wherein each of said first illumination pattern and said second illumination pattern comprises a sequence of alternating illuminance peaks; and wherein said first illumination pattern is substantially complementary to said second illumination pattern.

2. The lighting arrangement according to claim 1, wherein said lighting arrangement further comprises at least one supporting element for supporting said first and said second lighting devices.

3. The lighting arrangement according to claim 2, wherein said lighting arrangement comprises one supporting element having a vertical extension, and wherein said first and said second lighting devices are arranged at a distance from each other along said vertical extension of said supporting element.

4. The lighting arrangement according to claim 3, wherein said distance between said first and said second lighting device is from 0.5 m to 2 m.

5. The lighting arrangement according to claim 1, wherein said lighting arrangement comprises a first and a second supporting element arranged at a distance from each other, wherein said first lighting device is arranged on said first supporting element, and wherein said second lighting device is arranged on said second supporting element.

6. The lighting arrangement according to claim 5, wherein said distance between said first and said second supporting element is from 5 m to 10 m.

7. The lighting arrangement according to claim 1, wherein said lighting arrangement further comprises at least one beam-shaping optical element for shaping said first and/or said second light emitted by said first and/or said second light source into a beam of light.

8. The lighting arrangement according to claim 7, wherein said modulating optical element is arranged on said at least one beam-shaping optical element.

9. The lighting arrangement according to claim 1, wherein said lighting arrangement further comprises a cover plate being arranged to cover at least one of said first and said second light sources.

10. The lighting arrangement according to claim 9, wherein said modulating optical element is arranged on said cover plate.

11. The lighting arrangement according to claim 1, wherein said modulating optical element is a pattern corresponding to said first illumination pattern on said first target surface and/or said second illumination pattern on said second target surface.

12. The lighting arrangement according to claim 1, wherein said first and/or said second illumination pattern is a dynamic pattern.

13. The lighting arrangement according to claim 1, wherein said lighting arrangement comprises a control unit for individually controlling said first and said second light sources.

* * * * *